(12) United States Patent
Miyoshi et al.

(10) Patent No.: US 6,834,497 B2
(45) Date of Patent: Dec. 28, 2004

(54) EXHAUST GAS PURIFYING DEVICE FOR ENGINE

(75) Inventors: Seiji Miyoshi, Aki-gun (JP); Akihide Takami, Aki-gun (JP); Hiroshi Yamada, Aki-gun (JP); Masayuki Kuroki, Aki-gun (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 10/663,802

(22) Filed: Sep. 17, 2003

(65) Prior Publication Data

US 2004/0055278 A1 Mar. 25, 2004

(30) Foreign Application Priority Data

Sep. 20, 2002 (JP) ........................................ 2002-274714
Jul. 30, 2003 (JP) ........................................ 2003-203742

(51) Int. Cl.[7] ............................................... F01N 3/00
(52) U.S. Cl. ............................. 60/277; 60/276; 60/285; 60/292; 60/297
(58) Field of Search ......................... 60/276, 277, 278, 60/285, 290, 291, 292, 293, 295, 297, 301

(56) References Cited

U.S. PATENT DOCUMENTS 6,167,695 B1 * 1/2001 Itou et al. ..................... 60/274
6,374,596 B2 * 4/2002 Taga et al. .................... 60/277
6,383,267 B1 * 5/2002 Takaku et al. ................ 96/111
6,481,201 B2 * 11/2002 Kako et al. ................... 60/285
6,497,092 B1 * 12/2002 Theis ........................... 60/274

FOREIGN PATENT DOCUMENTS

JP         2000-337131         12/2000

* cited by examiner

Primary Examiner—Binh Q. Tran
(74) Attorney, Agent, or Firm—Donald R. Studebaker; Nixon Peabody, LLP (57) ABSTRACT

An exhaust gas purifying device of the present invention comprises NOx trap catalyst including NOx trap material, catalytic metal and O2 storage material, NOx sensor, section for releasing NOx when NOx absorbed amount of the NOx trap catalyst reaches a specified amount, section for determining diagnosis conditions of the NOx trap catalyst, section for detecting termination of O2 release from the O2 storage material, and section for diagnosing O2 storage capacity according to output value (NO1) of the NOx sensor during a term from beginning of the oxygen concentration lowering by the NOx release section until termination of the O2 release and for diagnosing NOx reduction capacity of the catalytic metal according to output value (NO2) of the NOx sensor after termination of O2 release, wherein a speed of lowering oxygen concentration during the diagnosis is set so as to be slower than that during non-diagnosis.

17 Claims, 4 Drawing Sheets

EXHAUST GAS PURIFYING DEVICE FOR ENGINE

BACKGROUND OF THE INVENTION

The present invention relates to an exhaust gas purifying device for an engine, and, more specifically, to an exhaust gas purifying device for an engine to remove NOx from exhaust gas of the engine.

An exhaust gas purifying device for an engine that performs a lean burn operation is known. Such a device is equipped with a NOx trap catalyst including a NOx trap material to absorb NOx during a state of high oxygen concentration in the exhaust gas and release the absorbed NOx during a state of low oxygen concentration in the exhaust gas. The NOx absorption capacity of the NOx tarp material is limited. Accordingly, in this exhaust gas purifying device, when the amount of NOx absorbed in the NOx tarp material reaches a saturation amount, a purifying control (so called, rich-spike control) is performed which changes an engine operating condition from the lean burn operation to an operation with a stoichiometric air-fuel ratio or the like to lower the concentration of oxygen in the exhaust gas. This control causes the NOx trap material to release NOx absorbed and to reduce and thereby purify the released NOx with a catalytic metal included in the NOx trap catalyst.

As a device for conducting a diagnosis of deterioration for this kind of NOx trap catalyst, Japanese Patent Laid-Open Publication No. 2000-337131 proposes a device making use of a peak value of an output of the NOx sensor during the rich-spike control. In this device, the deterioration is determined such that the lower the peak value of the NOx sensor at a transitional stage to a rich side becomes, the more NOx trap capacity of the NOx trap material has reduced, that is, the NOx trap catalyst has deteriorated.

The NOx trap catalyst, in general, includes a catalytic metal (noble metal) for oxidizing NOx and an O2 storage material for absorbing oxygen. However, the deterioration diagnosis device described in the above patent publication may not diagnose the deterioration of the reduction capacity of the catalytic metals or deterioration of O2 storage capacity of the O2 storage material.

Further, when the rich-spike control is executed, the following reactions occur sequentially: O2 release from the O2 storage material; oxidization of an exhaust gas composition by the released O2; NOx release from the NOx trap material; and reduction of the released NOx by the catalytic metal. However, if the air-fuel ratio of the exhaust gas is changed rapidly toward a rich side during NOx release, as performed in the deterioration diagnosis device described in the above publication, results of some reactions described above adversely affect or are mixed up with the output value of the NOx sensor due to an output delay of the NOx sensor or the like. Accordingly, a state of these reactions is not detected appropriately, so that each of deteriorations of O2 storage capacity of the O2 storage material (deterioration of O2 storage material) and reduction capacity of the catalytic metal (deterioration of catalytic metal) can not be diagnosed accurately.

SUMMARY OF THE INVENTION

The present invention has been devised in view of the above-described problems, and an object of the present invention is to provide an exhaust gas purifying device for an engine that performs the diagnosis function of diagnosing accurately each of deterioration of O2 storage capacity of an O2 storage material and NOx reduction capacity of a catalytic metal, which are included in a NOx trap catalyst.

In order to achieve the above-described object, the first aspect of the present invention provides an exhaust gas purifying device for an engine, comprising a NOx trap catalyst disposed in an exhaust gas passage of the engine including a NOx trap material to absorb NOx while oxygen of an exhaust gas is in high concentration and release the absorbed NOx while oxygen is in low concentration, a catalytic metal to purify the NOx released from the NOx trap material, and an O2 storage material to absorb O2 while oxygen of the exhaust gas is in high concentration and release the absorbed O2 while oxygen is in low concentration, a NOx sensor disposed in the exhaust gas passage downstream of the NOx trap catalyst, NOx absorbed amount calculating section for calculating the amount of NOx absorbed in the NOx trap catalyst, NOx release controlling section for lowering the concentration of oxygen of the exhaust gas in the exhaust gas passage so as to cause the NOx trap catalyst to release NOx absorbed when the amount of the NOx absorbed in the NOx trap catalyst reaches a specified amount, operating condition detecting section for detecting an operating condition of the engine, determination section for determining whether a specified diagnosis condition to diagnose the NOx trap catalyst is satisfied or not, according to the engine operating condition detected by the operating condition detecting section, detecting section for detecting whether or not O2 release from the O2 storage material caused by oxygen concentration lowering of the exhaust gas in the exhaust gas passage by the NOx release controlling section has terminated, diagnosing section for diagnosing a degree of deterioration of respective capacities of the O2 storage material and the catalytic metal that are included in the NOx trap catalyst when the specified diagnosis condition is satisfied, the diagnosing section diagnosing a degree of deterioration of O2 storage capacity of the O2 storage material according to output values of the NOx sensor that are generated during a term from the beginning of the oxygen concentration lowering of the NOx release controlling section until a termination of the O2 release from the O2 storage material, the diagnosing section diagnosing a degree of deterioration of NOx reduction capacity of the catalytic metal according to an output value of the NOx sensor that is generated after the termination of the O2 release from the O2 storage material, wherein the NOx release controlling section is configured such that a speed of lowering oxygen concentration thereby when the specified diagnosis condition is satisfied is slower than that when the specified diagnosis condition is not satisfied.

According to the exhaust gas purifying device for an engine of the first aspect of the invention, each of deterioration of O2 storage capacity of the O2 storage material and NOx reduction capacity of the catalytic metal, which are included in the NOx trap catalyst, can be diagnosed accurately, during a control (rich-spike control) for NOx release from the NOx trap catalyst for lowering the concentration of oxygen of the exhaust gas in the exhaust gas passage.

The second aspect of the present invention provides the exhaust gas purifying device of an engine of the first aspect of the invention, wherein the detecting section comprise an O2 sensor disposed in the exhaust gas passage downstream of the NOx trap catalyst, and O2 release termination determining section for determining that the O2 release from the O2 storage material has terminated when an output value of the O2 sensor indicates a value equivalent to a stoichiometric air-fuel ratio of the exhaust gas.

The third aspect of the present invention provides the exhaust gas purifying device of an engine of the first aspect of the invention, wherein the diagnosing section is configured so as to diagnose that O2 storage capacity of the O2 storage material included in the NOx trap catalyst has deteriorated when an integrated value of output values of the NOx sensor with respect to time during a term from the beginning of the oxygen concentration lowering of the NOx release controlling section until a termination of the O2 release from the O2 storage material is smaller than a first threshold value.

The fourth aspect of the present invention provides the exhaust gas purifying device of an engine of the first aspect of the invention, wherein the diagnosing section is configured so as to diagnose that O2 storage capacity of the O2 storage material included in the NOx trap catalyst has deteriorated when a value that is gained by dividing a difference between a maximum value and a minimum value of output values of the NOx sensor that are generated during a term from the beginning of the oxygen concentration lowering of the NOx release controlling section until a termination of the O2 release from the O2 storage material, by the time spent during the term is greater than a second threshold value.

According to the exhaust gas purifying device for an engine of the third and fourth aspects of the invention, the deterioration of O2 storage capacity of the O2 storage material included in the NOx trap catalyst can be detected by making use of the output values of the NOx sensor that are generated during the term from the beginning of rich-spike control by the NOx release controlling section until the termination of the O2 release from the O2 storage material.

The fifth aspect of the present invention provides the exhaust gas purifying device of an engine of the third aspect of the invention, further comprising first correcting section for correcting the first threshold value, in such a way that the greater a difference between the amount of absorbed NOx calculated by the NOx absorbed amount calculating section and the specified amount is, the greater value the first threshold value for diagnosing the deterioration of O2 storage capacity of the O2 storage material included in the NOx trap catalyst is corrected to.

The sixth aspect of the present invention provides the exhaust gas purifying device of an engine of the fourth aspect of the invention, further comprising second correcting section for correcting the second threshold value, in such a way that the greater a difference between the amount of absorbed NOx calculated by the NOx absorbed amount calculating section and the specified amount is, the smaller value the second threshold value for diagnosing the deterioration of O2 storage capacity of the O2 storage material included in the NOx trap catalyst is corrected to.

When the extremely larger amount of NOx than the specified amount has been absorbed for some reason, such as under a situation that the engine has been shut down during the previous rich-spike control, executing the deterioration diagnosis of the O2 storage material by using a normal threshold value may provide an erroneous diagnosis that the O2 storage material has not deteriorated yet, in spite of the fact that it has already deteriorated, because of too much NOx absorbed in the NOx trap catalyst. According to the exhaust gas purifying device for an engine of these aspects of the invention, however, when it is determined that the amount of NOx absorbed in the NOx trap catalyst is greater than the specified amount for determining the beginning of rich-spike control, the threshold value for determining the deterioration of O2 storage capacity is corrected in such a manner that determination of the deterioration of O2 storage capacity becomes apt to occur, according to the difference between the NOx absorbed amount and the specified amount for the determination. Accordingly, the above-described erroneous diagnosis can be prevented.

The seventh aspect of the present invention provides the exhaust gas purifying device of an engine of the first aspect of the invention, wherein the diagnosing section is configured so as to diagnose that NOx reduction capacity of the catalytic metal included in the NOx trap catalyst has deteriorated when a maximum value of output values of the NOx sensor that are generated after a termination of the O2 release from the O2 storage material is greater than a third threshold value.

The eighth aspect of the present invention provides the exhaust gas purifying device of an engine of the first aspect of the invention, wherein the diagnosing section is configured so as to diagnose that NOx reduction capacity of the catalytic metal included in the NOx trap catalyst has deteriorated when an integrated value of output values of the NOx sensor with respect to time during a term from a termination of the O2 release from the O2 storage material until a specified time has passed since the termination of the O2 release is greater than a fourth threshold value.

The ninth aspect of the present invention provides the exhaust gas purifying device of an engine of the first aspect of the invention, wherein the diagnosing section is configured so as to diagnose that NOx reduction capacity of the catalytic metal included in the NOx trap catalyst has deteriorated when a value that is gained by dividing a difference between a maximum value output values of the NOx sensor that are generated during a term from a termination of the O2 release from the O2 storage material until a specified time has passed since the termination of the O2 release and an output value of the NOx sensor that is generated at the time when the O2 release from the O2 storage material has terminated, by a difference between the output value of the NOx sensor that is generated at the time when the O2 release from the O2 storage material has terminated and an output value of the NOx sensor that is generated at the time when the specified time has passed is greater than a fifth threshold value.

According to the exhaust gas purifying device for an engine of the seventh through ninth aspects of the invention, the deterioration of NOx reduction capacity of the catalytic metal included in the NOx trap catalyst can be detected by making use of the output values of the NOx sensor that are generated during a specified term after the termination of the O2 release from the O2 storage material.

The tenth aspect of the present invention provides the exhaust gas purifying device of an engine of the eighth aspect of the invention, wherein the diagnosing section further comprising second correcting section for correcting the fourth threshold value, in such a way that the greater a difference between the amount of absorbed NOx calculated by the NOx absorbed amount calculating section and the specified amount is, the greater value the fourth threshold value is corrected to.

When the extremely larger amount of NOx than the specified amount has been absorbed for some reason, such as under a situation that the engine has been shut down during the previous rich-spike control, executing the deterioration diagnosis of the catalytic metal by using a normal threshold value may provide an erroneous diagnosis that the catalytic metal has not deteriorated yet, in spite of the fact that it has already deteriorated, because of too much NOx absorbed in the NOx trap catalyst. According to the exhaust gas purifying device for an engine of the tenth aspect of the invention, however, when it is determined that the amount of NOx absorbed in the NOx trap catalyst is greater than the specified amount for determining the beginning of rich-spike control, the threshold value for determining the deterioration of catalytic metal capacity is corrected in such a manner that determination of the deterioration of catalytic metal capacity becomes unlikely to occur, according to the difference between the NOx absorbed amount and the specified amount for the determination. Accordingly, the above-described erroneous diagnosis can be prevented.

The eleventh aspect of the present invention provides the exhaust gas purifying device of an engine of the first aspect of the invention, further comprising NOx trap capacity diagnosing section for diagnosing that NOx trap capacity of the NOx trap material included in the NOx trap catalyst has deteriorated when the sum of an integrated value of output values of the NOx sensor with respect to time during a term from the beginning of the oxygen concentration lowering of the NOx release controlling section until a termination of the O2 release from the O2 storage material and an integrated value of output values of the NOx sensor with respect to time during a term from the termination of the O2 release from the O2 storage material until a specified time has passed since the termination of the O2 release is smaller than a sixth threshold value.

The twelfth aspect of the present invention provides the exhaust gas purifying device of an engine of the first aspect of the invention, further comprising specified-amount correcting section for correcting the specified amount of NOx absorbed amount that is used by the NOx release controlling section in executing the NOx release to a smaller value when it is diagnosed that NOx reduction capacity of the catalytic metal included in the NOx trap catalyst has deteriorated.

According to the exhaust gas purifying device for an engine of the twelfth aspect of the invention, when NOx reduction capacity of the catalytic metal included in the NOx trap catalyst has deteriorated, that is, when the amount of NOx which can be reduced by the catalytic metal, the rich-spike control is performed in the condition where the amount of NOx absorbed in the NOx trap catalyst is small. Accordingly, this can decrease the amount of NOx released during the rich-spike control and the amount of NOx to be reduced by the catalytic metal, resulting in lightening NOx reduction capacity required in the catalytic metal.

The thirteenth aspect of the present invention provides the exhaust gas purifying device of an engine of the first aspect of the invention, further comprising oxygen concentration correcting section for setting the concentration of oxygen of the exhaust gas in the exhaust gas passage, which is lowered by the NOx release controlling section, to a higher value when it is diagnosed that O2 storage capacity of the O2 storage material included in the NOx trap catalyst has deteriorated.

The concentration of oxygen of the exhaust gas in the exhaust gas passage during the rich-spike control is set to a low value in expectation of O2 release from the O2 storage material. Accordingly, if O2 storage capacity of the O2 storage material has been decreased, an expected amount of O2 may not be released, resulting in a state of oxygen deficit. Herein, according to the exhaust gas purifying device for an engine of the thirteenth aspect of the invention, when O2 release capacity of the O2 storage material included in the NOx trap catalyst has deteriorated, that is, when the mount of O2 released from the O2 storage material during the rich-spike control decreases, for example, the oxygen concentration of the exhaust gas in the exhaust gas passage during the rich-spike control is set to a high value by an air-fuel control or the like. Accordingly, the shortage of O2 released from the O2 storage material can be compensated.

The fourteenth aspect of the present invention provides the exhaust gas purifying device of an engine of the first aspect of the invention, further comprising second diagnosing section for diagnosing that O2 storage capacity of the O2 storage material has deteriorated when the time spent from the beginning of the oxygen concentration lowering of the NOx release controlling section until a termination of the O2 release from the O2 storage material is shorter than a specified time.

According to the exhaust gas purifying device for an engine of the fourteenth aspect of the invention, the diagnosis of deterioration of the O2 storage material is executed based on only the time of O2 release from the O2 storage material.

The fifteenth aspect of the present invention provides the exhaust gas purifying device of an engine of the fourteenth aspect of the invention, wherein the second diagnosing section further comprising third correcting section for correcting the specified time to be used for diagnosing O2 storage capacity of the NOx trap catalyst, in such a way that the greater a difference between the amount of absorbed NOx calculated by the NOx absorbed amount calculating section and the specified amount is, the longer value the specified time is corrected to.

The sixteenth aspect of the present invention provides an exhaust gas purifying device of an engine, comprising, a NOx trap catalyst disposed in an exhaust gas passage of the engine including a NOx trap material to absorb NOx while oxygen of an exhaust gas is in high concentration and release the absorbed NOx while oxygen is in low concentration, a catalytic metal to purify the NOx released from the NOx trap material, and an O2 storage material to absorb O2 while oxygen of the exhaust gas is in high concentration and release the absorbed O2 while oxygen is in low concentration, a NOx sensor disposed in the exhaust gas passage downstream of the NOx trap catalyst, an O2 sensor disposed in the exhaust gas passage downstream of the NOx trap catalyst, an engine speed sensor operative to detect an engine speed, an accelerator opening sensor operative to detect an opening of an accelerator, an engine coolant temperature sensor operative to detect a temperature of an engine coolant, a control unit operative to receive output values of the respective sensors, and to control a fuel injector and an ignition timing of the engine and execute a diagnosis of deterioration of the NOx trap catalyst according to the received output values of the sensors, wherein the control unit calculates the amount of NOx absorbed in the NOx trap catalyst according to an output value of the NOx sensor, controls the fuel injector so as to lower the concentration of oxygen of the exhaust gas in the exhaust gas passage and thereby to cause the NOx trap catalyst to release NOx absorbed when the amount of the NOx absorbed in the NOx trap catalyst reaches a specified amount, determines that a specified diagnosis condition to diagnose the NOx trap catalyst is satisfied when the engine is warmed up with the engine coolant temperature that is greater than a specified temperature and the engine is in an ordinary state with a changing rate of the accelerator opening that is lower than a specified rate, detects whether or not O2 release from the O2 storage material caused by oxygen concentration lowering of the exhaust gas in the exhaust gas passage has terminated according to the output value of the O2 sensor, diagnoses, when the specified diagnosis condition is satisfied, that O2 storage capacity of the O2 storage material included in the NOx trap catalyst has deteriorated according to output values of the NOx sensor that are generated during a term from the beginning of the oxygen concentration lowering until a termination of the O2 release from the O2 storage material and that NOx reduction capacity of the catalytic metal included in the NOx trap catalyst has deteriorated according to an output value of the NOx sensor that is generated after a termination of the O2 release from the O2 storage material, and controls the fuel injector such that a speed of lowering oxygen concentration when the specified diagnosis condition is satisfied is slower than that when the specified diagnosis condition is not satisfied.

The seventeenth aspect of the present invention provides an exhaust gas purifying device of an engine, comprising a NOx trap catalyst disposed in an exhaust gas passage of the engine including a NOx trap material to absorb NOx while oxygen of an exhaust gas is in high concentration and release the absorbed NOx while oxygen is in low concentration, a catalytic metal to purify the NOx released from the NOx trap material, and an O2 storage material to absorb O2 while oxygen of the exhaust gas is in high concentration and release the absorbed O2 while oxygen is in low concentration, a NOx sensor disposed in the exhaust gas passage downstream of the NOx trap catalyst, an O2 sensor disposed in the exhaust gas passage downstream of the NOx trap catalyst, an engine speed sensor operative to detect an engine speed, an accelerator opening sensor operative to detect an opening of an accelerator, an engine coolant temperature sensor operative to detect a temperature of an engine coolant, a control unit operative to receive output values of the respective sensors, and to control a fuel injector and an ignition timing of the engine and execute a diagnosis of deterioration of the NOx trap catalyst, according to the received output values of the sensors, wherein the control unit calculates the amount of NOx absorbed in the NOx trap catalyst according to an output value of the NOx sensor, controls the fuel injector so as to lower the concentration of oxygen of the exhaust gas in the exhaust gas passage and thereby to cause the NOx trap catalyst to release NOx absorbed when the amount of the NOx absorbed in the NOx trap catalyst reaches a specified amount, determines that a specified diagnosis condition to diagnose the NOx trap catalyst is satisfied when the engine is warmed up with the engine coolant temperature that is greater than a specified temperature and the engine is in an ordinary state with a changing rate of the accelerator opening that is lower than a specified rate, detects whether or not O2 release from the O2 storage material caused by oxygen concentration lowering of the exhaust gas in the exhaust gas passage has terminated according to the output value of the O2 sensor, diagnoses, when the specified diagnosis condition is satisfied, that O2 storage capacity of the O2 storage material included in the NOx trap catalyst has deteriorated when an integrated value of output values of the NOx sensor with respect to time during a term from the beginning of the oxygen concentration lowering until a termination of the O2 release from the O2 storage material is smaller than a first threshold value and that NOx reduction capacity of the catalytic metal included in the NOx trap catalyst has deteriorated when a maximum value of output values of the NOx sensor that are generated after a termination of the O2 release from the O2 storage material is greater than a second threshold value, and controls the fuel injector such that a speed of lowering oxygen concentration when the specified diagnosis condition is satisfied is slower than that when the specified diagnosis condition is not satisfied.

BRIEF DESCRIPTION OF THE DRAWINGS

Other features, aspects, and advantages of the present invention will become apparent from the following description of the present invention which refers to the accompanying drawings.

DETAILED DESCRIPTION OF THE INVENTION

Figure 1:
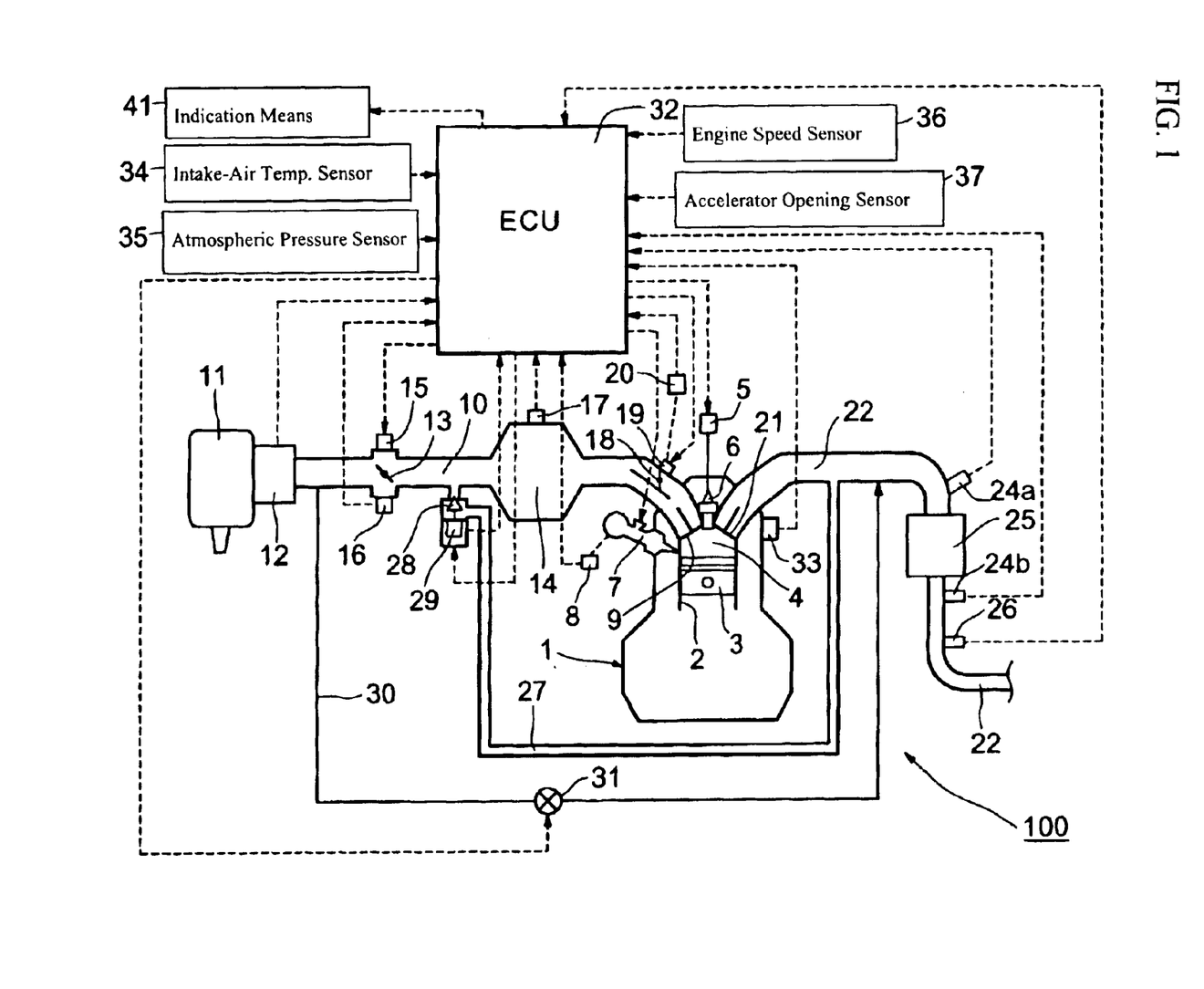
FIG. 1 is a diagram showing a schematic structure of an engine system equipped with an exhaust gas purifying device according to a preferred embodiment of the present invention.

Hereinafter, preferred embodiments of the present invention will be described with reference to the accompanying drawings. FIG. 1 is a diagram showing a schematic structure of an engine system 100 of a spark-ignition engine equipped with an exhaust purifying device according to a preferred embodiment of the present invention.

The engine system 100 comprises an engine body 1. The engine system performs a lean burn operation in which an air-fuel ratio is set to a value leaner than 14.7 (stoichiometric air-fuel ratio) in a specified operating condition. The engine body 1 is equipped with a plurality of cylinders 2 (only one cylinder shown in the figure) and a piston 3 that is disposed in each cylinder 2 so as to reciprocate in the cylinder 2, defining a combustion chamber 4 with the cylinder 2 and the piston 3. The combustion chamber 4 is provided with an ignition plug 6 coupled to an ignition circuit 5 at the top of the combustion chamber 4 in such a manner that the ignition plug 6 faces the combustion chamber 4. Further, an injector 7 is provided to spray a fuel directly into the combustion chamber 4.

The injector 7 is coupled with a fuel supply circuit including a high-pressure fuel pump, a pressure regulator and the like. The fuel supply circuit regulates a fuel from a fuel tank at an appropriate pressure and the fuel is supplied to the injector 7. A fuel pressure sensor 8 to detect a fuel pressure is provided in the fuel supply circuit.

The combustion chamber 4 communicates with an intake passage 10 through an intake port having an intake valve 9 therein. The intake passage 10 is provided, in order from an upstream end, with an air cleaner 11 to filter an intake air, an airflow sensor 12 to detect the amount of airflow, an electric-controlled throttle valve 13 to control a passage area of the intake passage 10, and a surge tank 14. The electric-controlled throttle valve 13 is driven by a motor 15 so as to open and close. Further, a throttle opening sensor 16 to detect a opening degree of the throttle valve 13 is disposed near the electric-controlled throttle valve 13, and an intake-air pressure sensor 17 to detect an intake air pressure is provided in the surge tank 14.

The intake passage 10 is comprised of independent passages branching off downstream of the surge tank 14, leading to respective cylinders. A downstream end of each independent passage is divided into two portions that lead to respective intake ports of an identical cylinder. A swirl valve 18 is disposed in either one of the divided portions. The swirl valve 18 is driven by an actuator 19. When the swirl valve 18 is closed, the intake air is supplied to the combustion chamber 14 only through the other branched passage, thereby generating a strong swirl of intake air in the combustion chamber 4. A swirl valve opening sensor 20 to detect an opening degree of the swirl valve 18 is also provided near the swirl valve 18.

The combustion chamber 4 is connected to an exhaust passage 22 through an exhaust port in which an exhaust valve 21 is disposed. The exhaust passages 22 from respective cylinders are merged downstream thereof. The merged exhaust passage 22 is provided, in order from an upstream end, with an upstream-side oxygen concentration sensor (O2 sensor) 24a, a NOx trap catalyst 25, a downstream-side oxygen concentration sensor (O2 sensor) 24b and a NOx sensor 26. The NOx trap catalyst 25 is of a NOx absorbing-and-reducing type that includes a NOx trap material and a catalytic metal (noble metal). The NOx trap material absorbs NOx while oxygen of an exhaust gas is in high concentration, such as in a lean burn operation, and release the absorbed NOx while oxygen is in low concentration. The catalytic metal (noble metal) reduces and thereby purifies the NOx released from the NOx trap material.

The NOx trap catalyst 25 includes a carrier in honeycomb structure made of cordierite. An inner catalyst layer is coated on a wall surface of each through hole formed in the carrier, and an outer catalyst layer is coated on the inner catalyst layer.

In the inner catalyst layer having NOx absorbing catalytic function, a noble metal such as platinum and a NOx trap material such as barium are carried on a support material formed out of a porous material such as alumina or ceria. Meanwhile, in the outer catalyst layer having NOx reduction function, a catalytic metal such as platinum and rhodium and, if necessary, a NOx trap material such as barium are carried on a support material formed out of a porous material such as zeolite.

The NOx trap catalyst 25, which is also required to function as a three-way catalyst, includes an O2 storage material such as ceria operative to store oxygen (O2) while the air-fuel ratio is lean and release stored O2 while the air-fuel ratio is rich, thereby purifying HC and CO. Further, the O2 storage material such as ceria also performs the function of causing the NOx trap material to improve its NOx absorption while the air-fuel ratio is lean.

Because the NOx trap catalyst 25 is limited in its NOx absorbing capacity, the present embodiment is configured such that when NOx value of the exhaust gas detected by the NOx sensor 26 exceeds a specified value equivalent to a value with some margin to the limited amount of NOx absorption (smaller than the limited amount), the amount of absorbed NOx by NOx trap material included in the NOx trap catalyst is determined to have reached a region where NOx purge is needed (saturation or near saturation), and then a control (rich-spike control) for releasing NOx from the NOx trap material is executed by lowering the oxygen concentration of the exhaust gas.

There is provided an exhaust gas recirculation passage 27 for recirculating part of the exhaust gas to an intake system, an upper-stream end of which is connected to the exhaust passage 22 upstream of the upstream-side oxygen concentration sensor 24a. A down-stream end of the exhaust gas recirculation passage 27 is connected with the intake passage 10 between the throttle valve 13 and the surge tank 14. Further, the exhaust gas recirculation passage 27 is provided with an exhaust gas recirculation valve 28 being electrically adjustable in its opening degree and a lift sensor 29 to detect the amount of lift of the exhaust gas recirculation valve 28. These components constitute exhaust gas recirculation means.

Further, there is provided a secondary-air supply passage 30 which supplies part of intake air from the intake passage 10 to the exhaust passage 22 upstream of the NOx trap catalyst 25. A flow regulating valve 31 is adjustably provided in the secondary-air supply passage 30.

The engine system 100 further comprises an ECU (electric control unit) 32 to control an entire system. Various signals of the airflow sensor 12, the throttle opening sensor 16, the intake-air pressure sensor 17, the swirl-valve opening sensor 20, the upstream-side and downstream-side oxygen concentration sensor 24a, 24b, and the lift sensor 29 of the exhaust gas recirculation valve 28 are inputted to the ECU 32. The ECU 32 further receives output signals of an engine coolant temperature sensor 33 to detect a temperature of coolant of the engine 1, an intake-air temperature sensor 34 to detect a temperature of intake air, an atmospheric pressure sensor 35 to detect a pressure of the atmosphere, engine speed sensor 36 to detect an engine speed, an accelerator opening sensor 37 to detect an opening degree of an accelerator pedal (operating amount of accelerator pedal), and the like.

The ECU 32 executes, according to the engine operating condition, a fuel injection control operative to control a fuel injection state of fuel injected by the injector 7, an ignition timing control operative to control an ignition timing of a mixture air by the ignition plug 6, a rich-spike control operative to release NOx from the NOx trap catalyst 25 by controlling the oxygen concentration of the exhaust gas when the amount of NOx absorbed at the NOx trap catalyst 25 reaches a specified amount, and deterioration diagnosing control operative to diagnose a degree of deterioration of the NOx trap catalyst 25 along with the rich-spike control and the like under a specified condition.

The fuel injection control is configured such that the fuel injection is controlled according to the engine operating condition. In the present embodiment, a stratified combustion mode control is performed in a lean operation region allotted for a driving condition with low speed and low load through moderate speed and moderate load, in which the injector 7 sprays fuel at one time at a specified timing during a compression stroke of the engine so as to concentrate sprayed fuel locally around the ignition plug 6, with the mixture being in a lean state of the air-fuel ratio of about 30. Meanwhile, in a first rich operation region allotted for a driving condition with a higher load than the stratified combustion mode, a stoichiometric combustion mode is performed in which the injector 7 sprays fuel at two times during an intake stroke and a compression stroke of the engine, with the mixture being in a stoichiometric state of $\lambda=1$. Further, in a second rich operation region allotted for a driving condition with higher speed and higher load than the first rich operation region, a homogeneous combustion mode is performed in which the injector 7 sprays fuel at one time during an intake stroke of the engine, with the mixture being in a rich state in the combustion chamber 4.

NOx generated in a large amount in the lean-burn state, is absorbed by the NOx trap catalyst 25 disposed downstream.

In the present embodiment, the amount of NOx absorbed in the NOx trap catalyst 25 is estimated according to the output signal of the NOx sensor 26. When it is determined that NOx absorption of the NOx trap catalyst 25 has saturated, a control such as air-fuel ratio control (rich-spike control) is executed to lower the oxygen concentration of the exhaust gas, for example, to 0.3% or less, thereby causing the NOx trap catalyst 25 to release the absorbed NOx. Further, the deterioration diagnosis of the NOx trap catalyst 25 is also executed according to the output signal of the NOx sensor 26 at this time. In the present embodiment, there is provided indication means 41, including a warning lamp and the like, that notifies a driver of the deterioration when it is determined that the NOx trap catalyst 25 has deteriorated.

Figure 2:
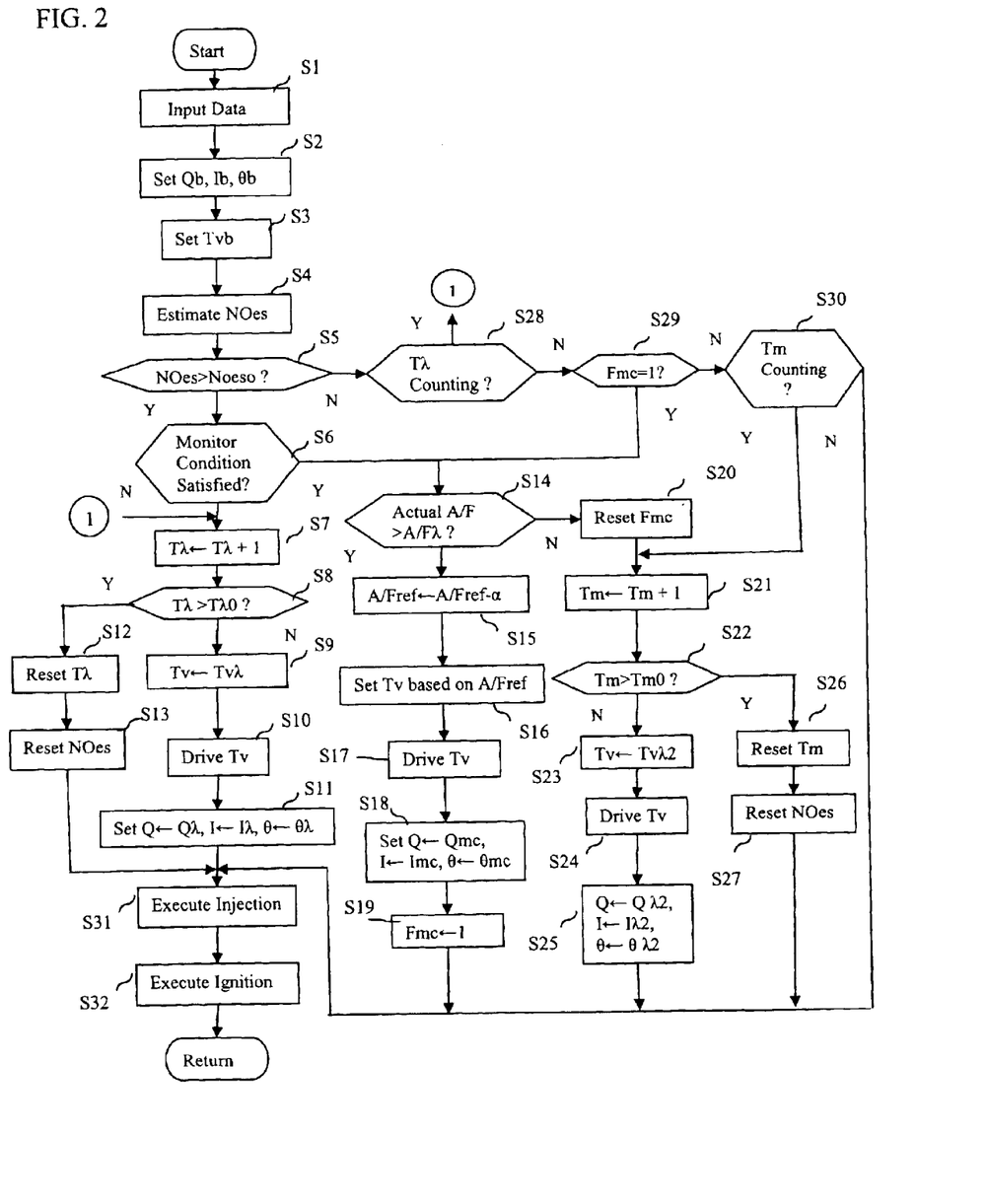
FIG. 2 is a flowchart illustrating a sequence routine of an engine control executed by an ECU.

Next, engine control process performed by the ECU 32 will be described referring to the flowchart of FIG. 2. In the present embodiment, when the amount of absorbed NOx has reached the saturation amount or an amount close to this, the rich-spike control is performed by changing the air-fuel ratio to lower the oxygen concentration of the exhaust gas, thereby causing the NOx trap catalyst to release NOx therefrom. Further, in the present embodiment, a speed or rate at which the oxygen concentration is lowered in the rich-spike control is controlled to be slower when the deterioration diagnosis of the NOx trap catalyst is executed along with the rich-spike control.

Firstly, in step S1, output signals of the airflow sensor 12, the upstream-side oxygen concentration sensor 24a, the NOx sensor 26, the engine coolant temperature sensor 33, the intake-air temperature sensor 34, the atmospheric pressure sensor 35, the engine speed sensor 36, the accelerator opening sensor 37 and the like are inputted as data. Next, in step S2, a basic fuel injection amount Qb, a basic fuel injection timing Ib, and an ignition timing $\theta$b are set according to the data inputted in step S1. Next, the sequence proceeds to step S3 where a basic throttle valve opening Tvb is set according to the data inputted in step S1.

Next, the sequence proceeds to step S4 where NOx absorbed amount NOes in the NOx trap catalyst 25 is estimated according to the output of the NOx sensor 26, and in step S5, it is determined whether the NOes is greater than a specified threshold value NOeso or not. The threshold value NOeso is a value to be used in the determination as to whether or not the amount of absorbed NOx of the NOx trap catalyst 25 has reached the saturation amount or an amount close to this. When the answer to step S5 is Yes, the NOx trap catalyst 25 has absorbed NOx up to its saturation value, meaning that the rich-spike control for releasing NOx is needed.

When the answer to step S5 is YES, the sequence proceeds to step S6 where it is determined whether or not a condition for executing the deterioration diagnosis (monitor) of the NOx trap catalyst 25 is satisfied. Namely, it is determined whether or not the operating condition is in a lean operation, an ordinary operation state, a warmed-up state and the number of times of the deterioration diagnosis held after an ignition ON is less than two times. When the answers to these are all YES, it is considered that the monitor condition has been satisfied. Herein, the "ordinary operation state" is an additional condition for the deterioration diagnosis so that the diagnosis can be performed accurately. The ordinary operation state is determined, for example, when a vehicle acceleration is less than a specified value, or the accelerator opening is less than a specified value. Also, "warmed-up state" is an another additional condition for executing the deterioration diagnosis of the NOx trap catalyst in a specified warmed-up state in which the NOx trap catalyst is in an activated state. The warm-up state is determined, for example, when the intake-air temperature or the engine coolant temperature is greater than a specified temperature or a specified time has passed since an engine starts. Herein, the number of times of the deterioration diagnosis described above may be set to one or less.

When the answer to step S6 is NO, namely when the monitor condition is not satisfied, a normal rich-spike control without the deterioration diagnosis is performed. Namely, the sequence proceeds to step S7, and 1 is added to a timer T$\lambda$ (increment) for rich-spike control. Then, in step S8, it is determined whether or not a value of the timer T$\lambda$ exceeds a specified value T$\lambda$o. When the answer to step S8 is NO, the sequence proceeds to step S9 where a throttle valve opening Tv is set to a throttle valve opening Tv$\lambda$ for rich-spike control. Then, in step S10, the throttle valve is driven so as to open at the throttle valve opening Tv$\lambda$. In the rich-spike control, the throttle valve opening Tv$\lambda$ for the rich-spike control is smaller than the throttle valve opening in a lean burn state so that the combustion is executed in the rich state and the oxygen concentration of the exhaust gas is lowered.

Subsequently, in step S11, the fuel injection amount, fuel injection timing and ignition timing are set respectively to a fuel injection amount Q$\lambda$, a fuel injection timing I$\lambda$ and an ignition timing $\theta\lambda$ for the rich-spike control. In the present embodiment, a split injection is performed during the rich-spike control operation, in which fuel injection is split into two-time injections and each of them is performed during the intake stoke and the compression stroke, respectively. Accordingly, the amount of fuel injection is set as an injection amount for the intake stroke and an injection amount for the compression stroke, respectively. Also, the timing of fuel injection is set as an injection timing for the intake stroke and an injection timing for the compression stroke. Herein, the injection amount, in the present embodiment, is set to an amount equivalent to an air-fuel ratio which is less than 14.5, so that the oxygen concentration of the exhaust gas is less than 0.3%. Accordingly, after the control begins, the oxygen concentration of the exhaust gas rapidly lowers to rich air-fuel ratio, for example, within one second.

When the answer to step S8 is YES, T$\lambda$ is reset in step S12 and then NOes is reset in step S13 so as to terminate the rich-spike control because the specified time has passed.

When the answer to step S6 is YES, the sequence proceeds to step S14 so as to execute the deterioration diagnosis of the NOx trap catalyst 25 along with the rich-spike control. In the present embodiment, at first tailing control for gradually lowering the oxygen concentration of the exhaust gas is performed in the rich-spike control which is performed along with the deterioration diagnosis of the NOx trap catalyst 25.

In step S14, it is determined whether an actual air-fuel ratio A/F reaches a final target air-fuel ratio A/F$\lambda$ or not. The final target air-fuel ratio is set such that it is a stoichimetric air-fuel ratio $\lambda$=1 before it is determined that O2 storage capacity of the NOx trap catalyst has deteriorated, while it is slightly leaner air-fuel ratio than $\lambda$=1 (A/F=15–16) when it is determined that O2 storage capacity of the NOx trap catalyst has deteriorated. The determination in step S14 is executed, for example, according to the output of the upstream-side oxygen concentration sensor 24a. When the answer to step S14 is YES, a target air-fuel ratio A/Fref is decreased by $\alpha$ in step S15. It is preferable that a value of $\alpha$ should be set to a value with which the air-fuel ratio changes from a lean state having a value greater than 22 to the stoichiometric air-fuel ratio state having a value of 14.7 in, for example, 5 seconds or so.

Next, the throttle valve opening Tv is set based on the decreased target air-fuel ratio A/Fref in step S16, and the throttle valve is driven according to this opening in step S17.

Subsequently, in step S18, a fuel injection amount Qmc, a fuel injection timing Imc and an ignition timing θmc for the tailing control are set respectively based on the target air-fuel ratio A/Fref set in step S15. Then, a flag Fmc for indicating is set to 1 in step S19.

Meanwhile, when the answer to step S14 is NO, namely when the actual air-fuel ratio is equal to the final target air-fuel ratio, a process for maintaining a rich (final target air-fuel) state is performed for a specified time. That is, the sequence proceeds to step S20 for resetting the flag Fmc, and then to step S21 for adding 1 to the timer Tm, which is used for maintaining the rich state, for timer increment, and subsequently to step S22 for determining whether the value of timer Tm exceeds a specified value Tm0 or not. When the answer to step S22 is NO, the sequence proceeds to step S23 for setting the throttle valve opening Tv to a throttle valve opening Tvλ2 for a rich air-fuel ratio (final target air-fuel ratio), and then in step S24, the throttle valve is adjusted so as to open at the throttle valve opening Tvλ2. Next, in step S25, the fuel injection amount, fuel injection timing and ignition timing are set respectively to a fuel injection amount Q λ2, a fuel injection timing Iλ2 and an ignition timing θλ2 for maintaining the rich (final target air-fuel ratio).

Meanwhile, when the answer to step S22 is YES, this means that the time period, during which the rich (target air-fuel ratio) state is maintained, has passed. Accordingly, the sequence proceeds to step S26 for resetting Tm and then to step S27 for resetting NOes.

When the answer to step S5 is NO, the sequence proceeds to step S28 where it is determined whether counting Tλ is in process or not. When the answer to step S28 is YES, meaning that the rich-spike control is in process, the sequence proceeds to step S7. When the answer to step S28 is NO, the sequence proceeds to step S29 for determining whether the flag Fmc for the tailing control is 1 or not. When the answer to S29 is YES, meaning that the tailing control is in process, the sequence proceeds to step S14. When the answer to step S29 is NO, the sequence proceeds to step S30 for determining whether or not counting the timer Tm indicating the duration of maintaining the rich (final target air-fuel ratio) state is in process. When the answer to step S30 is YES, the sequence proceeds to step S21. After step S11, step S13, step S19, step S25, step S27 and step S30 are terminated, the sequence proceeds to step S31 for executing the fuel injection in the set injection amount and timing, and then to step S32 for executing the ignition at the set timing.

Figure 3A:
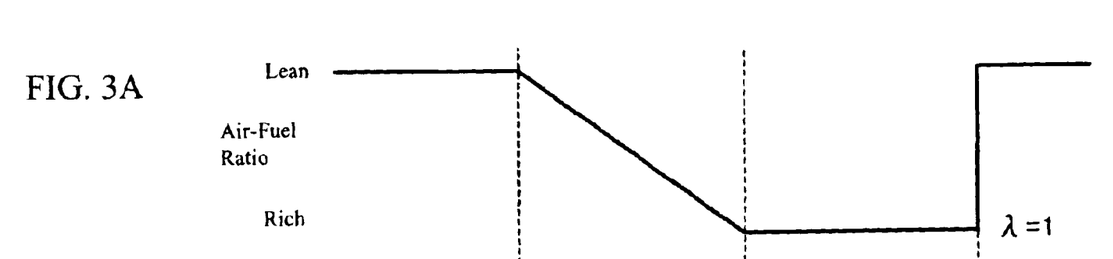
FIGS. 3A, 3B, and 3C are time charts illustrating respectively an air-fuel ratio, concentration of oxygen of an exhaust gas, and an output value of a NOx sensor 26, before and after a tailing control and a successive rich maintaining control.
Figures 3B, 3C:
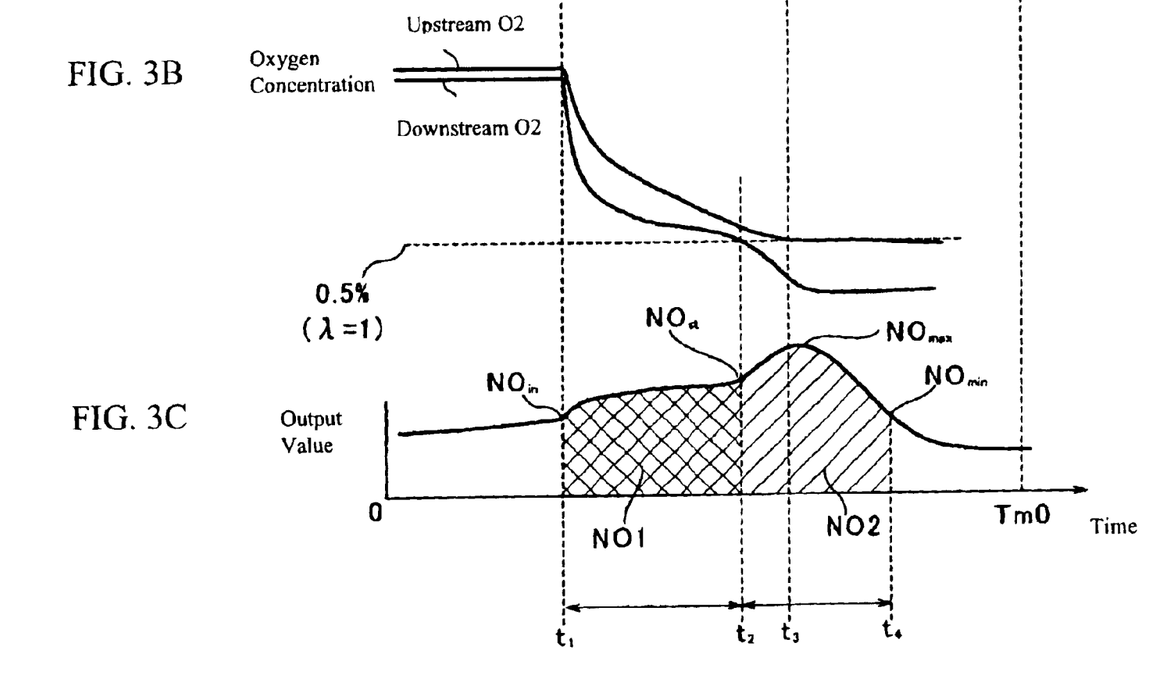

FIGS. 3A, 3B, and 3C are time charts illustrating respectively the air-fuel ratio, concentration of oxygen of the exhaust gas, and output of the NOx sensor 26, before and after the tailing control and the successive rich (final target air-fuel ratio) maintaining control, which are performed for the deterioration diagnosis of the NOx trap catalyst 25 in the present embodiment.

The air-fuel ratio of the exhaust gas is in a lean state just before the beginning of NOx release from the NOx trap catalyst 25. In the present embodiment, the air-fuel ratio control is performed in such a manner that it takes approximately five seconds to change from this lean state (for example, the air-fuel ratio of 22 or more) to a state with the air-fuel ratio of λ=1. Namely, the time from t1 to t3 in FIGS. 3A through 3C is set so as to be approximately five seconds. In the present embodiment, when it is recognized based on the output of the upstream-side oxygen concentration sensor 24a that the oxygen concentration of the exhaust gas upstream of the NOx trap catalyst 25 drops to the oxygen concentration of 0.5% which is equivalent to the air-fuel ratio of 14.7 (the final target air-fuel ratio), the tailing control is terminated and the air-fuel ratio is maintained at this state.

When this rich-spike control begins (at t1), the oxygen concentration (the upstream-side oxygen concentration) of the exhaust gas flowing into the NOx trap catalyst 25 lowers due to the lowering of the air-fuel ratio, and O2 release from the O2 storage material included in the NOx trap catalyst 25 is executed (FIG. 3B). Accordingly, during the O2 release from the O2 storage material, the oxygen concentration of the exhaust gas surrounding the NOx trap catalyst shifts toward a leaner side (namely, to leaner air-fuel ratio) and thereby NO release from the NOx trap material is suppressed. Thus, when O2 release from the O2 storage material has terminated, the lean-shifting of the exhaust gas surrounding the NOx trap catalyst disappears, so that NOx release from the NOx trap material increases rapidly. Herein, when O2 release from the O2 storage material has terminated (at t2), the O2 concentration of the exhaust gas downstream of the NOx trap catalyst 25 lowers rapidly, and thus, completion of O2 release from the O2 storage material can be detected according to the O2 concentration of the exhaust gas downstream of the NOx trap catalyst.

Accordingly, when the air-fuel ratio lowers, the amount of NOx release from the NOx trap material included in the NOx trap catalyst 25 increases gradually from NOin. The amount of this NOx release increases rapidly when the O2 release from the O2 storage material has terminated (at t2), and increases up to a peak value (NOmax), and then it drops to NOmin (at t4) and maintains its approximately constant level after that. In the present embodiment, as described above, a state of NOx release of the NOx trap catalyst when the air-fuel ratio is lowered for reducing the oxygen concentration is divided into two stages (t1–t2, t2–t4). Herein, output values (the region indicated by mesh in FIG. 3C) of the NOx sensor at a first stage (t1–t2) relates to a degree of deterioration of the O2 storage capacity of the O2 storage material included in the NOx trap catalyst (the deterioration of the O2 storage material), while output values (the region indicated by oblique lines in FIG. 3C) of the NOx sensor at a second stage (t2–t4) relates to a degree of deterioration of the NOx reduction capacity of the catalytic metal included in the NOx trap catalyst (the deterioration of the catalytic metal). Thus, the degree of deterioration of the O2 storage capacity of the O2 storage material included in the NOx trap catalyst (the deterioration of the O2 storage material), and the degree of deterioration of the NOx reduction capacity of the catalytic metal included in the NOx trap catalyst (the deterioration of the catalytic metal) can be diagnosed according to the output values of the NOx sensor at each of these stages.

Figure 4:
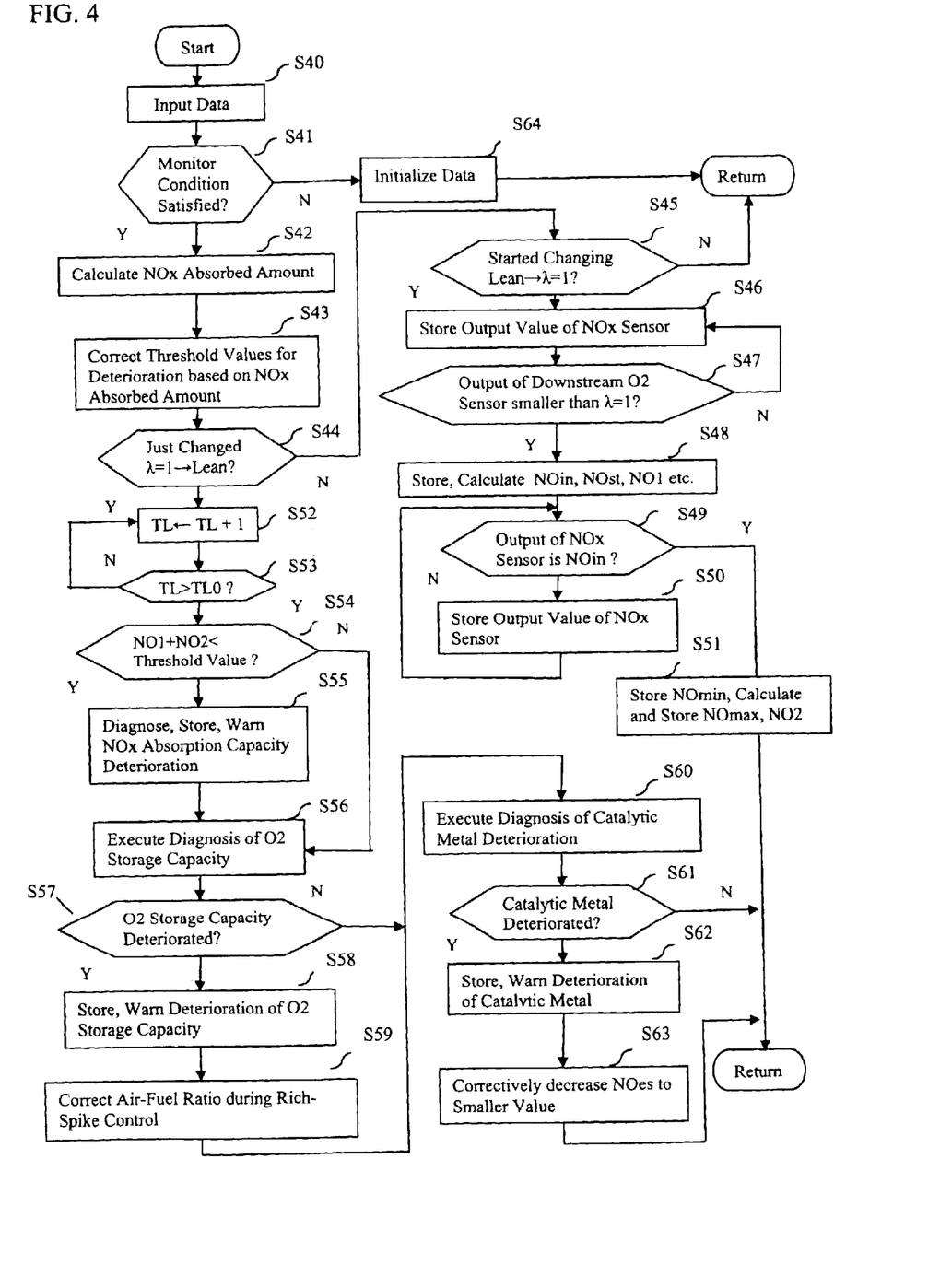
FIG. 4 is a flowchart illustrating a sequence routine of a diagnosis control of deterioration of a NOx trap catalyst executed by the ECU.

Next, deterioration diagnosis process of the NOx trap catalyst 25, which is executed by the ECU 32, will be described referring to the flowchart of FIG. 4.

Firstly, in step S40, data of accelerator opening, accelerator opening change, engine speed, engine coolant temperature and the like are inputted. Next, the sequence proceeds to step S41 where the same determination as step S6 of FIG. 2 is made, namely the determination is made as to whether a condition for starting a monitor (diagnosis) is satisfied or not. When the answer to S41 is YES, the sequence proceeds to step S42 for calculating the amount of absorbed NOx in the NOx trap catalyst 25 according to the output value of the NOx sensor 26 and the engine operating conditions. Namely, because the amount of NOx of the exhaust gas upstream of the NOx trap catalyst 25 can be estimated according to the engine operating conditions and the amount of NOx in the exhaust gas downstream of the NOx trap catalyst 25 can be estimated according to the output of the NOx sensor 26, the amount of absorbed NOx of the NOx trap catalyst 25 can be calculated based on a look-up table storing some reference values that have been obtained through experiments in advance.

Subsequently, the sequence proceeds to step S43, and herein a process for correcting the threshold value for the deterioration of O2 storage material and the threshold value for the deterioration of catalytic material is executed according to the absorbed NOx amount of the NOx trap catalyst 25 that has been calculated in step S42. Specifically, the process is executed in such a manner that the greater the difference between the absorbed NOx amount calculated in step S42 and the threshold value for starting rich-spike control NOeso (the specified value) is, the greater value a first threshold value for diagnosing the deterioration of O2 storage capacity of the NOx trap catalyst 25, which will be described later, is corrected to. Thus, the determination of deterioration of the O2 storage material becomes apt to occur. Further, the process is executed in such a manner that the greater the difference between the absorbed NOx amount calculated in step S42 and the threshold value for starting rich-spike control NOeso (the specified value) is, the smaller value a second threshold value for diagnosing the deterioration of O2 storage capacity of the NOx trap catalyst 25 which will be described later is corrected to. Thus, the determination of deterioration of the O2 storage material becomes apt to occur.

In the event that extremely larger amount of NOx than the specified amount has been absorbed in the NOx trap catalyst, because of the engine's shut-down during the previous rich-spike control or other reasons, deterioration diagnosis of the O2 storage material by using the normal threshold value would lead to the erroneous diagnosis result that the O2 storage material has not yet deteriorated due to the large amount of absorbed NOx, in spite of the fact that it has already deteriorated. For this reason, when it is determined that the amount of NOx absorbed in the NOx trap catalyst is greater than the specified amount which is the threshold value for determining the start of the rich-spike control, the threshold value for determining deterioration of O2 storage capacity is corrected in such a manner that determination of the deterioration of O2 storage capacity becomes apt to occur, according to the difference between the absorbed NOx amount and the specified value of the threshold value, thereby preventing such erroneous diagnosis.

Further, at least one of threshold values for deterioration diagnosis of the catalytic metal included in the NOx trap catalyst (third, fourth and fifth threshold values), which will be described later, is corrected in such a manner that the greater a difference between the amount of absorbed NOx calculated in step S42 and a threshold value for the start of rich-spike control (specified amount) is, the greater value the threshold values is corrected to. Thus, the determination of deterioration of the catalytic metal becomes unlikely to occur.

In the event that extremely larger amount of NOx than the specified amount has been absorbed in the NOx trap catalyst, because of the engine's shut-down during the previous rich-spike control or other reasons, deterioration diagnosis of the catalytic metal by using the normal threshold value would lead to erroneous diagnosis result that the catalytic metal has not deteriorated due to the large amount of absorbed NOx in spite of the fact that it has already deteriorated. For this reason, when it is determined that the amount of NOx absorbed in the NOx trap catalyst is greater than the specified amount which is the threshold value for determining the start of the rich-spike control, the threshold value for determining deterioration of catalytic metal storage is corrected in such a manner that determination of the deterioration of the catalytic metal becomes unlikely to occur, according to the difference between the absorbed NOx amount and the specified value of the threshold value, thereby preventing such erroneous diagnosis.

Further, a specified time to be used for diagnosing O2 storage capacity of the NOx trap catalyst, which will be described later, is corrected in such a manner that the greater a difference between the amount of absorbed NOx calculated in step S42 and a threshold value for the start of rich-spike control (specified amount) is, the longer value the specified time is corrected to. Thus, the determination of deterioration of the O2 storage capacity becomes apt to occur.

In the present embodiment, the first through fourth threshold values are corrected in step S43, and the specified time used for the deterioration diagnosis of the O2 storage capacity, which will described later, is corrected. However, these may not be necessarily corrected, otherwise either one of these threshold values and specified time may be corrected.

When the process of step S43 terminates, the sequence proceeds to step S44 where it is determined whether or not the air-fuel ratio has just changed from $\lambda=1$ (rich state) to lean state. This aims at determining whether the rich-spike control has just terminated or not.

Then the answer to step S44 is NO, the sequence proceeds to step S45 for determining whether or not the air-fuel ratio has just started changing from lean state to $\lambda=1$ (rich state) (that is, whether the time is after t1 or not). When the answer to step S45 is YES, the rich-spike control is in process, accompanied by the deterioration diagnosis. Accordingly, the sequence proceeds to step S46 for storing output values of the NOx sensor 26. Subsequently, the sequence proceeds to step S47 where it is determined whether or not the output value of the downstream-side oxygen concentration sensor 25b is lower than a value indicating the downstream-side oxygen concentration of the exhaust gas with the air-fuel ratio $\lambda=1$. When the answer to step S47 is NO, the current time point is within the term of t1–t2 when O2 release from the O2 storage material included in the NOx trap catalyst 25 continues. Accordingly, the sequence proceeds to step S46 where the process for storing the output of the NOx sensor 26 is repeated until the answer to step S47 turns to YES. An output of the NOx sensor 26 stored initially in step S46 is stored as NOin, while an output of the NOx sensor 26 stored finally in step S46 is stored as NOst.

When the answer to step S47 is YES, it is determined that t2 has been reached in FIG. 3C, and then the sequence proceeds to step S48 for calculating and storing the NOx output values NOin and NOst, the time (t2–t1) and an integration value (NO1) of the output value of the NOx sensor with respect to the term (t1–t2). Next, the sequence proceeds to step S49 for determining whether the output of the NOx sensor 26 is equal to NOin or not. When the answer to step S49 is NO, the current time point is within the term of t2 through t4. Accordingly, the sequence proceeds to step S50 for storing the output value of the NOx sensor 26, and the process of step S50 is repeated until the output value of the NOx trap sensor 26 turns to NOin.

When the answer to step S49 is YES, this instant is set as t4, and then the sequence proceeds to step S51. In step S51, the output value of the NOx sensor at this instant is stored as NOmin, and the maximum value NOmax of output values of the NOx sensor 26 during the term from t2 through t4 and an integrated value (NO2) of output values of the NOx sensor during the term (t2–t4) are calculated and stored, and the sequence returns.

On the other hand, when the answer to step S44 is YES, the sequence proceeds to step S52 for the increment of timer TL, and then to step S53 for determining whether the timer TL exceeds a specified value TL0 or not. When the answer to step S44 is YES, the rich-spike control has terminated, and then a time for stabilization is kept in steps S52 and S53.

When the answer to step S53 is YES, the sequence proceeds to step S54 where it is determined whether or not the sum of the above integration values NO1 and NO2 is less than the threshold value for determining a degree of NOx absorption. When the answer to step S54 is YES, namely (NO1+NO2) is less than the threshold value for determining degree of NOx absorption (sixth threshold value), it is determined that NOx trap capacity of the NOx trap material included in the NOx trap catalyst 25 has deteriorated (deterioration diagnosis). Accordingly, in step S55, the fact that NOx tarp capacity of the NOx trap catalyst 25 has deteriorated is stored readably in a memory and executes warning such as tuning on a warning lamp or the like.

When the answer to step S54 is NO and the process of step S55 terminates, the sequence proceeds to step S56 for executing deterioration diagnosis of the O2 storage material included in the NOx trap catalyst 25.

In the purification device of the present embodiment, at least one of the following three methods of deterioration diagnosis is or are executed. The first method is to determine that O2 storage capacity of the O2 storage material included in the NOx trap catalyst 25 has deteriorated when an integrated value of output values of the NOx sensor with respect to the time during the term from the beginning point (t1) of oxygen concentration lowering (rich-spike control) by the air-fuel ratio control until the terminating point (t2) of O2 release from the O2 storage material is less than a specified threshold value (first threshold value). The second method is to determine that O2 storage capacity of the O2 storage material included in the NOx trap catalyst 25 has deteriorated when a value that is gained by dividing a difference between the maximum value and the minimum value of output values of the NOx sensor that are generated during the term from the beginning point (t1) of the rich-spike control by the air-fuel ratio control until the terminating point (t2) of O2 release from the O2 storage material, by the time of the term (t1–t2) is greater than a specified threshold value (second threshold value). The third method is to determine that O2 storage capacity of the O2 storage material included in the NOx trap catalyst 25 has deteriorated when the time from the beginning point (t1) of the rich-spike control until the terminating point (t2) of O2 release from the O2 storage material is a specified time.

These threshold values and the specified time are corrected appropriately in step S43, according to the amount of NOx absorbed in the NOx trap catalyst.

When the deterioration diagnosis terminates, the sequence proceeds to step S57 where it is determined whether O2 storage capacity has deteriorated or not, namely the O2 storage material has deteriorated or not. In the present embodiment, when the plurality of methods of deterioration diagnosis are executed, at least one deterioration determination gives the diagnosis result that O2 storage capacity has deteriorated (O2 storage deterioration). When the answer to step S57 is YES, the sequence proceeds to step S58, and the fact that O2 storage capacity of the O2 storage material has deteriorated (deterioration of O2 storage material) is stored readably in a memory and executes warning such as tuning on a warning lamp or the like.

Next, the sequence proceeds to step S59 for setting the target air-fuel ratio (A/F) at the rich-spike control to a value that is leaner than λ=1. Namely, in order to compensate for some amount of O2 released from the O2 storage material during the rich-spike control, oxygen concentration of the exhaust gas in the exhaust passage which is materialized by the air-fuel ratio control is set to a value lower than a value which is actually required in the exhaust passage. For this reason, if O2 storage capacity of the O2 storage material has deteriorated, an expected amount of O2 may not be released from the O2 storage material, so that the oxygen concentration of the exhaust gas in the exhaust passage at the rich-spike control may be less than the target value. Herein, in the present embodiment, when the amount of O2 released from the O2 storage material included in the NOx trap catalyst is decreased at the rich-spike control due to the deterioration of O2 storage capacity of the O2 storage material, the oxygen concentration of the exhaust gas in the exhaust passage at the rich-spike control is set to a higher value than that when O2 storage capacity of the O2 storage material has not deteriorated yet in step S59. In this manner, enough oxygen concentration of the exhaust gas in the exhaust passage during the rich-spike control can be ensured even when O2 storage capacity of the O2 storage material has deteriorated.

When the answer to step S57 is NO or the process of step S59 terminates, the sequence proceeds to step S60 and deterioration diagnosis of the catalytic metal included in the NOx trap catalyst 25 is executed.

In the purifying device of the present invention, at least one of the flowing three methods of deterioration diagnosis is executed. The first method is to determine that NOx reduction capacity of the catalytic metal included in the NOx trap catalyst 25 has deteriorated when the maximum value (NOmax) of output values of the NOx sensor that are generated after the terminating point (t2) of O2 release from the O2 storage material is greater than a specified threshold value (third threshold value).

Further, the second method is to determine that NOx reduction capacity of the catalytic metal included in the NOx trap catalyst 25 has deteriorated when an integrated value of output values of the NOx sensor with respect to the time during the term from the terminating point (t2) of O2 release from the O2 storage material until a point (t4) when a specified time has passed since the terminating point of O2 release is grater than a specified threshold value (fourth threshold value).

Further, the third method is to determine that NOx reduction capacity of the catalytic metal included in the NOx trap catalyst 25 has deteriorated when a value that is gained by dividing a difference between a maximum value NOmax of output values of the NOx sensor that are generated during a term from the terminating point (t2) of O2 release from the O2 storage material until the point (t4) when the specified time has passed since the terminating point and an output value NOxin of the NOx sensor that is generated at the time when the O2 release from the O2 storage material has terminated, by a difference between the output value of the NOx sensor that is generated at the point (t2) when the O2 release from the O2 storage material has terminated and an output value of the NOx sensor that is generated at the point (t4) when the specified time has passed is greater than a specified value (fifth threshold value).

These threshold values are corrected appropriately in step S43 according to the amount of NOx absorbed in the NOx trap catalyst.

When deterioration diagnosis of the catalytic metal terminates, the sequence proceeds to step S61 for determining whether reduction capacity of the catalytic metal has lowered or not, namely the catalytic metal has deteriorated or not. In the present embodiment, when the plurality of methods of deterioration diagnosis are executed, at least one deterioration determination gives the diagnosis result that NOx reduction capacity has deteriorated (catalytic metal deterioration). When the answer to step S61 is YES, the sequence proceeds to step S62, and the fact that NOx reduction capacity of the catalytic metal has deteriorated (deterioration of catalytic metal) is stored readably in a memory and executes warning such as tuning on a warning lamp or the like.

Next, the sequence proceeds to step S63 where the threshold value NOeso for starting the rich-spike control is corrected to a smaller value. Because NOx reduction capacity of the catalytic metal included in the NOx trap catalyst has deteriorated and thereby the mount of NOx which can be reduced by the catalytic metal has lowered, the rich-spike control is performed under a condition that the amount of NOx absorbed in the NOx trap catalyst is small. Accordingly, NOx can be prevented from being emitted out of the engine exhaust system. When the answer to step S61 is NO or process in step S63 has terminated, the sequence returns.

Further, when the answer to S41 is NO, the sequence proceeds to step S64. In this step, data such as output values of the NOx sensor, output values of the oxygen concentration sensor, timer TL, NOst, NOin, NOmin, NOmax, time pasting of (t1–t2), output-integrated value (NO1) of the NOx sensor from t1 until t2, output-integrated value (NO2) of the NOx sensor from t2 until t4 and the like are reset, and then the sequence returns. When the answer to step S43 is NO, the sequence returns as well.

Any other additional modifications may be applied within the scope of a sprit of the present invention.

For example, in the above-described embodiment, it is determined according to the output of the upstream-side oxygen concentration sensor 24a in step S14 whether or not the actual air-fuel ratio A/F reaches a value A/Fλ which is air-fuel ratio λ=1. Instead of this, the determination may be made when a specified time has passed since the beginning point of the tailing control. Further, other methods of diagnosing the deterioration may be applied as well.

Further, the present embodiment shows an example in which the air-fuel ratio is controlled so as to change from a lean state to a state with λ=1 for five seconds or so. Of course, the present invention should not be limited by the exemplified time, and a proper time can be chosen, for example, from a range of three seconds through thirty seconds, based on various conditions.

What is claimed is:

1. An exhaust gas purifying device for an engine, comprising:
   a NOx trap catalyst disposed in an exhaust gas passage of the engine including a NOx trap material to absorb NOx while oxygen of an exhaust gas is in high concentration and release the absorbed NOx while oxygen is in low concentration, a catalytic metal to purify the NOx released from said NOx trap material, and an O2 storage material to absorb O2 while oxygen of the exhaust gas is in high concentration and release the absorbed O2 while oxygen is in low concentration;
   a NOx sensor disposed in the exhaust gas passage downstream of said NOx trap catalyst;
   NOx absorbed amount calculating means for calculating the amount of NOx absorbed in said NOx trap catalyst;
   NOx release controlling means for lowering the concentration of oxygen of the exhaust gas in the exhaust gas passage so as to cause said NOx trap catalyst to release NOx absorbed when the amount of the NOx absorbed in said NOx trap catalyst reaches a specified amount;
   operating condition detecting means for detecting an operating condition of the engine;
   determining means for determining whether a specified diagnosis condition to diagnose said NOx trap catalyst is satisfied or not, according to the engine operating condition detected by said operating condition detecting means;
   detecting means for detecting whether or not O2 release from said O2 storage material caused by oxygen concentration lowering of the exhaust gas in the exhaust gas passage by said NOx release controlling means has terminated;
   diagnosing means for diagnosing a degree of deterioration of respective capacities of said O2 storage material and said catalytic metal that are included in said NOx trap catalyst when said specified diagnosis condition is satisfied, said diagnosing means diagnosing a degree of deterioration of O2 storage capacity of said O2 storage material according to output values of said NOx sensor that are generated during a term from the beginning of the oxygen concentration lowering of said NOx release controlling means until a termination of the O2 release from said O2 storage material, said diagnosing means diagnosing a degree of deterioration of NOx reduction capacity of said catalytic metal according to an output value of said NOx sensor that is generated after the termination of the O2 release from said O2 storage material,
   wherein said NOx release controlling means is configured such that a speed of lowering oxygen concentration thereby when said specified diagnosis condition is satisfied is slower than that when said specified diagnosis condition is not satisfied.

2. The exhaust gas purifying device of an engine of claim 1, wherein said detecting means comprise an O2 sensor disposed in the exhaust gas passage downstream of said NOx trap catalyst, and O2 release termination determining means for determining that the O2 release from said O2 storage material has terminated when an output value of said O2 sensor indicates a value equivalent to a stoichiometric air-fuel ratio of the exhaust gas.

3. The exhaust gas purifying device of an engine of claim 1, wherein said diagnosing means is configured so as to diagnose that O2 storage capacity of said O2 storage material included in said NOx trap catalyst has deteriorated when an integrated value of output values of said NOx sensor with respect to time during a term from the beginning of the oxygen concentration lowering of said NOx release controlling means until a termination of the O2 release from said O2 storage material is smaller than a first threshold value.

4. The exhaust gas purifying device of an engine of claim 1, wherein said diagnosing means is configured so as to diagnose that O2 storage capacity of said O2 storage material included in said NOx trap catalyst has deteriorated when a value that is gained by dividing a difference between a maximum value and a minimum value of output values of said NOx sensor that are generated during a term from the beginning of the oxygen concentration lowering of said NOx release controlling means until a termination of the O2 release from said O2 storage material, by the time spent during said term is greater than a second threshold value.

5. The exhaust gas purifying device an engine of claim 3, further comprising first correcting means for correcting said first threshold value, in such a way that the greater a difference between the amount of absorbed NOx calculated by said NOx absorbed amount calculating means and said specified amount is, the greater value said first threshold value for diagnosing the deterioration of O2 storage capacity of said O2 storage material included in said NOx trap catalyst is corrected to.

6. The exhaust gas purifying device of an engine of claim 4, further comprising second correcting means for correcting said second threshold value, in such a way that the greater a difference between the amount of absorbed NOx calculated by said NOx absorbed amount calculating means and said specified amount is, the smaller value said second threshold value for diagnosing the deterioration of O2 storage capacity of said O2 storage material included in said NOx trap catalyst is corrected to.

7. The exhaust gas purifying device of an engine of claim 1, wherein said diagnosing means is configured so as to diagnose that NOx reduction capacity of said catalytic metal included in said NOx trap catalyst has deteriorated when a maximum value of output values of said NOx sensor that are generated after a termination of the O2 release from said O2 storage material is greater than a third threshold value.

8. The exhaust gas purifying device of an engine of claim 1, wherein said diagnosing means is configured so as to diagnose that NOx reduction capacity of said catalytic metal included in said NOx trap catalyst has deteriorated when an integrated value of output values of said NOx sensor with respect to time during a term from a termination of the O2 release from said O2 storage material until a specified time has passed since the termination of the O2 release is greater than a fourth threshold value.

9. The exhaust gas purifying device of an engine of claim 1, wherein said diagnosing means is configured so as to diagnose that NOx reduction capacity of said catalytic metal included in said NOx trap catalyst has deteriorated when a value that is gained by dividing a difference between a maximum value of output values of said NOx sensor that are generated during a term from a termination of the O2 release from said O2 storage material until a specified time has passed since the termination of the O2 release and an output value of said NOx sensor that is generated at the time when the O2 release from said O2 storage material has terminated, by a difference between the output value of said NOx sensor that is generated at the time when the O2 release from said O2 storage material has terminated and an output value of said NOx sensor that is generated at the time when said specified time has passed is greater than a fifth threshold value.

10. The exhaust gas purifying device of an engine of claim 8, wherein said diagnosing means further comprising second correcting means for correcting said fourth threshold value, in such a way that the greater a difference between the amount of absorbed NOx calculated by said NOx absorbed amount calculating means and said specified amount is, the greater value said fourth threshold values is corrected to.

11. The exhaust gas purifying device of an engine of claim 1, further comprising NOx trap capacity diagnosing means for diagnosing that NOx trap capacity of said NOx trap material included in said NOx trap catalyst has deteriorated when the sum of an integrated value of output values of said NOx sensor with respect to time during a term from the beginning of the oxygen concentration lowering of said NOx release controlling means until a termination of the O2 release from said O2 storage material and an integrated value of output values of said NOx sensor with respect to time during a term from the termination of the O2 release from said O2 storage material until a specified time has passed since the termination of the O2 release is smaller than a sixth threshold value.

12. The exhaust gas purifying device of an engine of claim 1, further comprising specified-amount correcting means for correcting said specified amount of NOx absorbed amount that is used by said NOx release controlling means in executing the NOx release to a smaller value when it is diagnosed that NOx reduction capacity of said catalytic metal included in said NOx trap catalyst has deteriorated.

13. The exhaust gas purifying device of an engine of claim 1, further comprising oxygen concentration correcting means for setting the concentration of oxygen of the exhaust gas in the exhaust gas passage, which is lowered by said NOx release controlling means, to a higher value when it is diagnosed that O2 storage capacity of said O2 storage material included in said NOx trap catalyst has deteriorated.

14. The exhaust gas purifying device of an engine of claim 1, further comprising second diagnosing means for diagnosing that O2 storage capacity of said O2 storage material has deteriorated when the time spent from the beginning of the oxygen concentration lowering of said NOx release controlling means until a termination of the O2 release from said O2 storage material is shorter than a specified time.

15. The exhaust gas purifying device of an engine of claim 14, wherein said second diagnosing means further comprising third correcting means for correcting said specified time to be used for diagnosing O2 storage capacity of said NOx trap catalyst, in such a way that the greater a difference between the amount of absorbed NOx calculated by said NOx absorbed amount calculating means and said specified amount is, the longer value said specified time is corrected to.

16. An exhaust gas purifying device for an engine, comprising:
  a NOx trap catalyst disposed in an exhaust gas passage of the engine including a NOx trap material to absorb NOx while oxygen of an exhaust gas is in high concentration and release the absorbed NOx while oxygen is in low concentration, a catalytic metal to purify the NOx released from said NOx trap material, and an O2 storage material to absorb O2 while oxygen of the exhaust gas is in high concentration and release the absorbed O2 while oxygen is in low concentration;
  a NOx sensor disposed in the exhaust gas passage downstream of said NOx trap catalyst;
  an O2 sensor disposed in the exhaust gas passage downstream of said NOx trap catalyst;
  an engine speed sensor operative to detect an engine speed;
  an accelerator opening sensor operative to detect an opening of an accelerator;
  an engine coolant temperature sensor operative to detect a temperature of an engine coolant;

a control unit operative to receive output values of said respective sensors, and to control a fuel injector and an ignition timing of the engine and execute a diagnosis of deterioration of said NOx trap catalyst, according to said received output values of the sensors;

wherein said control unit calculates the amount of NOx absorbed in said NOx trap catalyst according to an output value of said NOx sensor; controls said fuel injector so as to lower the concentration of oxygen of the exhaust gas in the exhaust gas passage and thereby to cause said NOx trap catalyst to release NOx absorbed when the amount of the NOx absorbed in said NOx trap catalyst reaches a specified amount; determines that a specified diagnosis condition to diagnose said NOx trap catalyst is satisfied when the engine is warmed up with the engine coolant temperature that is greater than a specified temperature and the engine is in an ordinary state with a changing rate of the accelerator opening that is lower than a specified rate; detects whether or not O2 release from said O2 storage material caused by oxygen concentration lowering of the exhaust gas in the exhaust gas passage has terminated according to the output value of said O2 sensor; diagnoses, when said specified diagnosis condition is satisfied, that O2 storage capacity of said O2 storage material included in said NOx trap catalyst has deteriorated according to output values of said NOx sensor that are generated during a term from the beginning of the oxygen concentration lowering until a termination of the O2 release from said O2 storage material and that NOx reduction capacity of said catalytic metal included in said NOx trap catalyst has deteriorated according to an output value of said NOx sensor that is generated after a termination of the O2 release from said O2 storage material; and controls the fuel injector such that a speed of lowering oxygen concentration when said specified diagnosis condition is satisfied is slower than that when said specified diagnosis condition is not satisfied.

17. An exhaust gas purifying device for an engine, comprising:

a NOx trap catalyst disposed in an exhaust gas passage of the engine including a NOx trap material to absorb NOx while oxygen of an exhaust gas is in high concentration and release the absorbed NOx while oxygen is in low concentration, a catalytic metal to purify the NOx released from said NOx trap material, and an O2 storage material to absorb O2 while oxygen of the exhaust gas is in high concentration and release the absorbed O2 while oxygen is in low concentration;

a NOx sensor disposed in the exhaust gas passage downstream of said NOx trap catalyst;

an O2 sensor disposed in the exhaust gas passage downstream of said NOx trap catalyst;

an engine speed sensor operative to detect an engine speed;

an accelerator opening sensor operative to detect an opening of an accelerator;

an engine coolant temperature sensor operative to detect a temperature of an engine coolant;

a control unit operative to receive output values of said respective sensors, and to control a fuel injector and an ignition timing of the engine and execute a diagnosis of deterioration of said NOx trap catalyst, according to said received output values of the sensors;

wherein said control unit calculates the amount of NOx absorbed in said NOx trap catalyst according to an output value of said NOx sensor; controls said fuel injector so as to lower the concentration of oxygen of the exhaust gas in the exhaust gas passage and thereby to cause said NOx trap catalyst to release NOx absorbed when the amount of the NOx absorbed in said NOx trap catalyst reaches a specified amount; determines that a specified diagnosis condition to diagnose said NOx trap catalyst is satisfied when the engine is warmed up with the engine coolant temperature that is greater than a specified temperature and the engine is in an ordinary state with a changing rate of the accelerator opening that is lower than a specified rate; detects whether or not O2 release from said O2 storage material caused by oxygen concentration lowering of the exhaust gas in the exhaust gas passage has terminated according to the output value of said O2 sensor; diagnoses, when said specified diagnosis condition is satisfied, that O2 storage capacity of said O2 storage material included in said NOx trap catalyst has deteriorated when an integrated value of output values of said NOx sensor with respect to time during a term from the beginning of the oxygen concentration lowering until a termination of the O2 release from said O2 storage material is smaller than a first threshold value and that NOx reduction capacity of said catalytic metal included in said NOx trap catalyst has deteriorated when a maximum value of output values of said NOx sensor that are generated after a termination of the O2 release from said O2 storage material is greater than a second threshold value; and controls the fuel injector such that a speed of lowering oxygen concentration when said specified diagnosis condition is satisfied is slower than that when said specified diagnosis condition is not satisfied.

* * * * *